United States Patent [19]

Goudy, Jr. et al.

[11] Patent Number: 4,629,126
[45] Date of Patent: Dec. 16, 1986

[54] FLUID DIFFUSER

[75] Inventors: Paul R. Goudy, Jr.; William G. Weekley, both of Milwaukee, Wis.

[73] Assignee: Autotrol Corporation, Milwaukee, Wis.

[21] Appl. No.: 700,606

[22] Filed: Feb. 11, 1985

[51] Int. Cl.$^4$ ................................................ B05B 1/32
[52] U.S. Cl. ............................... 239/452; 239/533.13; 261/123; 261/65
[58] Field of Search ...................... 261/121.1, 122, 123, 261/124, 65, 121 R; 239/451, 452, 533.1, 533.18, 533.14

[56] References Cited

U.S. PATENT DOCUMENTS

| | | | |
|---|---|---|---|
| 3,525,436 | 8/1970 | Reckers | 261/124 X |
| 3,575,350 | 4/1971 | Willinger | 261/122 X |
| 3,756,580 | 9/1973 | Dunn | 261/123 |

FOREIGN PATENT DOCUMENTS 1247395 9/1971 United Kingdom .

OTHER PUBLICATIONS

PCI Hydro-Chek Air Diffusers "Simple and Cost Effective".

Chicago Pump Bulletin 7823.
Chicago Pump Bulletin 7822-A.

Primary Examiner—Joseph F. Peters, Jr.
Assistant Examiner—Kevin Patrick Weldon
Attorney, Agent, or Firm—Quarles & Brady

[57] ABSTRACT

A diffuser for air or other fluids has a rigid body with an upper disc portion having a series of radially projecting fingers about its perimeter. The fingers are relatively narrow and blunt. A diaphragm formed of a soft elastomer has a rim portion which receives the fingers. The diaphragm overlies the disc and normally closes a central opening in the body. Spaces at the base of the fingers are not covered by the rim portion of the diaphragm and air or other fluid escapes through those spaces when it is admitted under pressure through the central opening in the body. A circular cylindrical wall depends from beneath the disc at the bases of the teeth to discourage the fluid from collecting beneath the disc. In another embodiment, the spaces through which the fluid passes are covered by an open cell foam in the form of a ring that surrounds the wall and that is held in place against the rim portion by a plate mounted to the body and seated against the bottom of the wall. The fluid is forced through the foam to exit as fine bubbles.

9 Claims, 6 Drawing Figures ical, for the diaphragm to hold it to the rigid disc. In this ap-
FLUID DIFFUSER

BACKGROUND OF THE INVENTION

This invention relates to fluid diffusers, and particularly to an improved diffuser that is useful for introducing bubbles of air into wastewater to be treated.

In the aeration treatment of wastewater, it is common to introduce the air through a series of submerged diffusers mounted at spaced positions along the length of a manifold pipe. The diffusers have apertures through which the air can escape, preferably as small bubbles. A common type of diffuser uses a rubber or rubber-like flexible diaphragm working against a flat, rigid disc. When air is not being admitted to the diffuser, the flexible diaphragm seats against the hard disc under the pressure of the water and seals the air openings thereby functioning as a check valve. When air is admitted under pressure, the flexible diaphragm moves away from the disc and opens the apertures to allow the air to escape.

One form of flexible diaphragm diffuser is disclosed in U.S. Pat. No. 3,525,436 issued Aug. 25, 1970 to D. J. Reckers for "Sewage Treatment Plant." In the diffuser of that patent, the rigid disc has a series of holes located inwardly of its perimeter. The flexible diaphragm overlays the top surface of the disc and is joined to the perimeter of the disc by a clamp. When air is introduced under pressure sure through a central opening in the disc, the diaphragm is unseated and air can pass between the diaphragm and the top surface of the disc and out the bottom of the disc through the holes.

Another form of diaphragm diffuser traps the diaphragm between the top surface of the disc and an upper retaining ring. When air under pressure is admitted through a central disc opening, the diaphragm moves off of the top of the disc and air can escape radially outwardly between the disc and the diaphragm.

In contrast to the above forms that use clamps or retainer rings to hold the diaphram to the disc, another approach is characterized by relying on the resiliency of the diaphragm to hold it to the rigid disc. In this approach, the rigid disc typically has a scalloped perimeter that is grasped by a rim of the diaphragm. In one version, holes are provided in the diaphragm and the holes are closed until the diaphragm is moved away from the disc when air is admitted through a central opening in the disc. Another version of this approach is described in the copending application Ser. No. 655,890, now U.S. Pat. No. 4,597,530 of Paul R. Goudy, et al. for "Fluid Diffuser", filed Aug. 28, 1984 and assigned to the assignee of this application. The diffuser of that application has a diaphragm that is uninterrupted by holes and the air passages are instead provided at the valleys of the scalloped perimeter which are not covered by the diaphragm.

All such air diffusers encounter the problem of the build-up of deposits in the air openings, particularly when hard water is treated. The resulting calcium deposits can partially close the air passages if the operation of the diffuser does not tend to cause the deposits to be physically broken up. The resulting increase in air pressure working against the diaphragm can cause the diaphragm to be blown loose of the disc in those diffusers that do not use clamps or retaining rings. The use of a softer, more flexible material for the diaphragm tends to break-up and dislodge deposits because of the greater flexing of the diaphragm during use. The softer material also provides better sealing against the disc when the diaphragm is functioning as a check valve. However, the use of softer material increases the tendency to blow the diaphragm loose from the scalloped edges of the rigid disc.

A diffuser in accordance with the present invention uses the resiliency of the diaphragm to hold it in place on the rigid disc, but because of the manner of mounting the diaphragm, a soft, flexible elastomer can be used without danger of blowing-off the diaphragm even under extreme fluid pressure overloads. The diffuser also insures the formation of small, discrete bubbles or drops of the fluid being diffused. Although the diffuser is particularly useful in diffusing air or other gas into a liquid, it is also useful for introducing one liquid into another. Accordingly, the diffuser is capable of handling fluids of all types, both liquids and gasses.

SUMMARY OF THE INVENTION

In accordance with the invention there is provided a diffuser that includes a rigid disc having a central opening, a plurality of spaced rigid fingers extending radially outwardly at the perimeter of the disc, and a wall depending from the underside of the disc between the central opening and the disc perimeter, togethr with a flexible diaphragm that has a flat uninterrupted portion overlaying the top face of the disc and a rim portion that receives only an outer portion of each finger to thereby define passage at the junctions of the fingers to the disc, which passages are opened when air or other fluid is admitted under pressure through the central opening. The wall prevents the build-up of large bubbles along the underside of the disc.

The diffuser of the invention is preferably formed with relatively narrow, blunt fingers that merge at their bases to the disc with curved surfaces, and the rim portion of the diaphragm has recesses that receive less than the entire length of each finger to leave the bases of the fingers free. The central opening is formed in a hollow boss that is integral with the disc and which may be provided with standard pipe threads.

Further in accordance with the invention, the diffuser has its fluid passages covered by an open cell foam material to insure the dispersion of the air or other fluid into small, discrete bubbles as it leaves the diffuser. In the preferred embodiment, the foam material is a flexible plastic foam formed as a ring that is mounted around the outside of the wall and over the passages, and the ring is compressed into place by a rigid, flat plate mounted on the boss and seated against the bottom edge of the wall.

It is a principal object of the invention to provide an efficient fluid diffuser, particularly useful for the introduction of air in wastewater treatment, which is comprised of but two parts held together by their own force.

It is also an object of the invention to provide such a diffuser that employs an elastomeric diaphragm of softer material than was previously possible with a resultant increase in flexibility for purpose of self cleaning and for better operation as a check valve.

It is another object of the invention to provide such a diffuser in which the fluid is forced to escape in small, discrete bubbles.

The foregoing and other objects and advantages of the invention will appear in the following detailed description. In the description reference is made to the

DETAILED DESCRIPTION OF THE PREFERRED EMBODIMENTS

Figure 1:
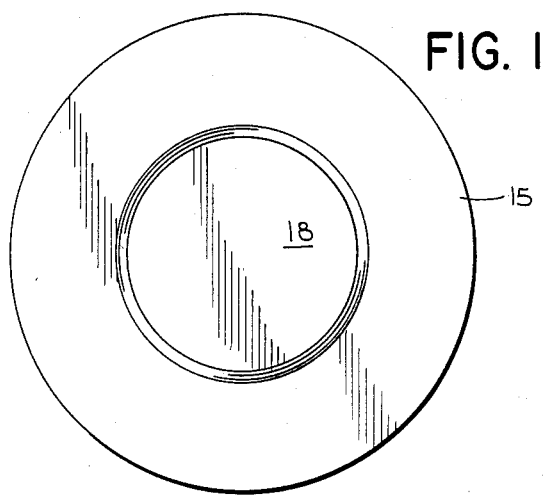
FIG. 1 is a top plan view of a diffuser in accordance with a first embodiment of the invention.
Figure 2:
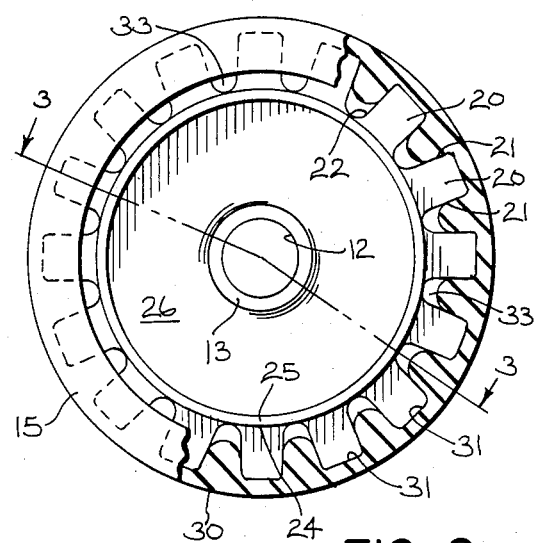
FIG. 2 is a bottom view of the diffuser of FIG. 1 with portions broken away for purposes of illustration.
Figure 3:
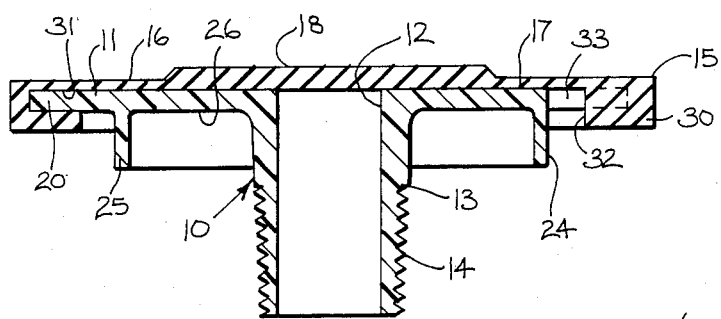
FIG. 3 is a view in vertical section taken in the plane of the line 3—3 of FIG. 2.

Referring to FIGS. 1–4, the improved diffuser of the present invention has a rigid body 10 that includes a flat disc 11 with a central opening 12 and an integral, hollow boss 13 that is an extension of the central opening 12 and which has standard external pipe threads 14. A flexible rubber diaphragm 15 has a flat upper portion 16 that overlays the top face 17 of the disc 11. The flat portion 16 of the diaphragm has a built up center portion 18 that acts as a check valve to close off the central opening 12 under the pressure of water above the diffuser. The diaphragm 15 is formed of a soft rubber or other elastomer. Good results have been achieved to data with a durometer hardness as low as 30D.

The outer perimeter of the disc 11 has a plurality of spaced fingers 20 that are formed integral with the disc 11. The fingers 20 are relatively narrow with parallel sides 21, and have blunted ends with rounded corners. The fingers 20 each merge into the disc 11 at gently curved surfaces 22 between the bases of the fingers. Because of the parallel sides of the fingers 20, the spaces between adjacent fingers 20 are somewhat wedged shaped. A depending circular cylindrical wall 24 is formed on a flange 25 that extends from the bottom face 26 of the disc 11 at the bases of the fingers 20.

The diaphragm 15 has a thick rim portion 30 with a series of radial recesses 31 that receive and complement the blunt ends of the fingers 20. The rim portion 30 has a inwardly facing inner edge 32 that is spaced from the flange 25. The bases of the fingers 20 are thereby left free so that air openings 33 are defined at the bottom of the spaces between adjacent fingers 20.

Figure 4:
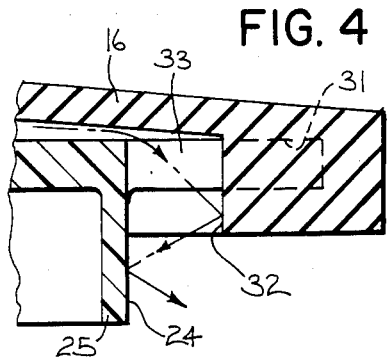
FIG. 4 is a partial view in section to an enlarged scale illustrating the opening of the air passages in the diffuser of FIGS. 1–3.

When air under pressure is admitted into the central opening 12, the flat upper portion 16 of the diaphragm 15 will tend to lift off of the top face 17 of the disc 11 and air can then escape radially between the disc 11 and diaphragm 15, and out of the openings 33 (see FIG. 4). Air exiting the passages 33 would have a tendency to congregate on the underside of the disc 11 where it would form large bubbles that are released only when they achieve a certain size. This is an undesirable phenomenon since it means that the air is released into the surrounding media in large bursts and the bubble size is much too large to provide effective aeration. The presence of the wall 24 prevents this phenomenon from occurring. That is, air cannot travel towards the central boss 13 along the underside of the disc but instead will immediately encounter the wall 24. The path of the air is shown in phantom line in FIG. 4. As a result, the air is released in the form of small discrete bubbles.

The form of the fingers 20, both their length and shape, provide an excellent mounting to hold the flexible diaphragm 15 in place on the body 10. The blunt termination of the fingers 20 and their straight, nearly radial sides resist any tendency of the diaphragm to peal-off the disc 11 even under severe pressure overloads. Because of the secure mounting that results, the diaphragm 15 can be formed of very soft and flexible elastomeric material so that it is relatively easy to stretch the diaphragm to initially mount the diaphragm upon the rigid body 10. The diaphragm will also deform significantly during use, and this deformation and flexing of the diaphragm 15 causes the break-up of deposits that might otherwise form and contributes to keeping the air passages open. The softer material also has a longer service life because there is less tendency for the material to fatigue.

Although the wall 24 is illustrated as being formed on a flange 25, it could be the outer wall of a solid cylinder that extends from the boss 13 to the bosses of the fingers 20. The use of a flange is preferred since it saves material.

Figure 5:
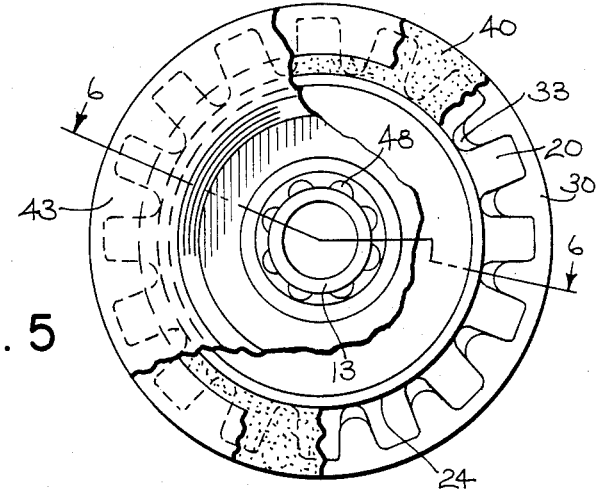
FIG. 5 is a bottom view of an alternate embodiment of the diffuser with portions broken away for purposes of illustration.
Figure 6:
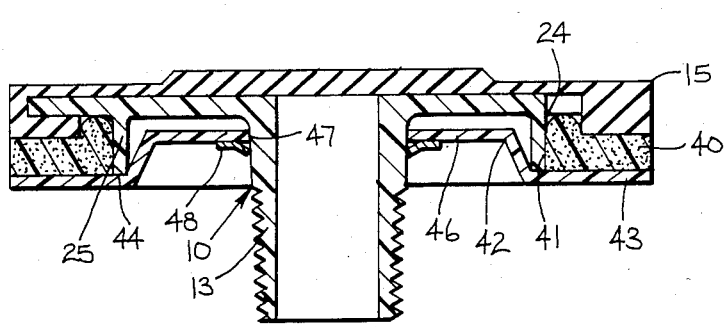
FIG. 6 is a view in vertical section of the alternative embodiment taken in the plane of the line 6—6 of FIG. 5.

The formation of finer bubbles and an even more effective dispersal pattern is possible by use of the second embodiment of the invention. Referring to FIGS. 5 and 6, the second embodiment is identical to the first embodiment with the exception that an open cell plastic foam ring 40 is mounted over the air passages 33. Specifically, the ring 40 has a large central opening 41 sized to match that of the diameter of the wall 24 so that the ring 40 fits over the flange 25. The ring 40 extends to the outer diameter of the diaphragm 15. The ring 40 is held in place by a plate 42 that has a flat portion 43 which bears against the ring 40 and seats against the bottom edge 44 of the flange 25. The center portion 46 of the plate 42 is inwardly dished and has a central opening 47 that is mounted about the boss 13. The plate 42 is held in place by a toothed snap ring 48 that engages the outer circumference of the boss 13. The plate could also be held in place by a threaded ring mounted on the boss 13.

The ring 40 is preferably formed of a flexible foam material and has a normal thickness that is greater than that of the space that it will occupy when the plate 42 has seated against the bottom edge 44 of the flange 25. The ring 40 is compressed by the plate 42 and is forced into the air passages 33 (see FIG. 6). Air exiting the passages 33 is forced through the open cells of the ring 40 and dispersed radially out of the diffuser as small discrete bubbles about the outer edge of the ring 40.

The size of the bubbles can be adjusted by selecting foams of various pore sizes and by varying the amount by which the foam ring is compressed. In one successful test of a diffuser in accordance with the second embodiment, a foam having 80 pores per inch was compressed two-thirds by volume.

The bulge in the foam ring that is created by forcing the ring 40 into the space between the edge 32 of the rim 30 and the wall 24 has operating advantages. First, the bulge helps to anchor the ring to the diffuser. Second, the pores in the bulge are not compressed to the same degree as those in the space between the rim 30 and flat portion 43 of the plate 42. As a result, there is a two stage filter effect with the air first divided and then divided again into smaller parts as the air passes through the ring 40.

The foam ring 40 is not glued or otherwise attached to the surfaces of the rim 30 or plate 42. This facilitates replacement of the ring and also allows for the release of air between the ring 40 and the surfaces of the rim 30 and flat portion 43 should the pores of the ring 40 become clogged with bacteria or other solids.

We claim:

1. A fluid diffuser, comprising:

a rigid disc having top and bottom faces and a central fluid inlet extending through said faces, a plurality of spaced rigid fingers projecting radially outwardly at the perimeter of the disc, said fingers having parallel sides that curve into the disc at their junction with the disc, and a cylindrical wall depending from the bottom face of the disc between the central inlet and the disc perimeter, said wall disposed at the junction of the fingers with the disc; and a flexible diaphragm including a flat, uninterrupted portion that overlays the top face of the disc and a rim portion that receives the ends of the fingers, the rim portion receiving less than the entire length of the fingers so that fluid passages are provided between adjacent fingers at the junction of the fingers with the disc.

2. A diffuser in accordance with claim 1 wherein foam in the form of a ring is mounted about the wall and is held in place by a rigid plate that seats against the bottom edge of the wall.

3. A diffuser in accordance with claim 2 wherein the ring is compressed between the rigid plate and the rim portion of the diaphragm and a portion of the ring extends into the space between the rim portion and the wall.

4. A diffuser in accordance with claim 3 wherein the portion of the ring that extends into the space between the rim portion and the wall is compressed to a lesser extent than the portion of the ring disposed between the rigid plate and the rim portion.

5. A diffuser in accordance with claim 1, wherein said diaphragm is formed of a soft elastomer.

6. A diffuser in accordance with claim 4, together with an open cell flexible foam covering the air passages.

7. An air diffuser, comprising:

a rigid disc having top and bottom faces, a central air inlet extending through said faces, a plurality of spaced, integral, blunt fingers extending radially outwardly about the perimeter of the disc with the adjacent fingers joined to each other at their bases by curved surfaces, and a circular cylindrical wall depending from the bottom face between the central inlet and the disc perimeter; and a flexible diaphragm including a flat, uninterrupted portion that overlays the top face of the disc and a rim portion extending downwardly from the flat portion and including an inwardly facing peripheral edge, the rim portion having recesses extending radially outwardly from the edge, the recesses receiving and holding the outer portions only of the fingers with the edge spaced from the bases of the fingers to define air passages between the edge and the curved surfaces at the bases of the fingers.

8. A diffuser in accordance with claim 7 further including a foam material in the form of a flexible ring mounted about said wall and compressed between the underside of the fingers, said rim portion and a rigid plate that seats against the bottom edge of the wall.

9. A diffuser in accordance with claim 8 wherein said central inlet is formed in a depending boss and said plate is removably mounted about and secured to said boss.

* * * * *